United States Patent
Caruk et al.

(10) Patent No.: US 6,678,780 B1
(45) Date of Patent: Jan. 13, 2004

(54) METHOD AND APPARATUS FOR SUPPORTING MULTIPLE BUS MASTERS WITH THE ACCELERATED GRAPHICS PROTOCOL (AGP) BUS

(75) Inventors: Gordon Caruk, Bramalea (CA); Kuldip S. Sahdra, Richmond Hill (CA); David I. J. Glen, Toronto (CA)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/411,661

(22) Filed: Oct. 4, 1999

(51) Int. Cl.$^7$ ................................ G06F 13/36
(52) U.S. Cl. .............. 710/306; 710/300; 710/309; 710/315
(58) Field of Search ............... 710/305, 306, 710/309, 301, 311, 313, 315, 300; 345/520

(56) References Cited

U.S. PATENT DOCUMENTS

| 5,892,964 | A | * | 4/1999 | Horan et al. ............... 710/1 |
| 5,923,860 | A | * | 7/1999 | Olarig .................... 710/104 |
| 5,937,173 | A | * | 8/1999 | Olarig et al. ............. 710/312 |
| 6,057,863 | A | * | 5/2000 | Olarig .................... 345/501 |
| 6,230,223 | B1 | * | 5/2001 | Olarig .................... 710/104 |

\* cited by examiner

Primary Examiner—Sumati Lefkowitz
Assistant Examiner—X. Chung-Trans
(74) Attorney, Agent, or Firm—Vedder, Price, Kaufman & Kammholz, P.c

(57) ABSTRACT

A method and apparatus for supporting multiple bus masters on an AGP bus is presented. A first bus master is configured as an AGP bus master and utilizes the AGP request portion of the AGP bus structure to issue bus master requests. A second bus master is configured as a PCI bus master and utilizes the PCI bus master request portion of the AGP bus to assert bus master requests. When bus master grants are received via the AGP bus, status lines are used to determine the character of the bus master grant. When the status lines indicate that the bus master grant is an AGP bus master grant, the AGP bus master performs AGP bus master operations. When the status lines indicate that the bus master grant is a PCI bus master grant, the PCI bus master is enabled and allowed to perform PCI bus mastering operations.

18 Claims, 2 Drawing Sheets

METHOD AND APPARATUS FOR SUPPORTING MULTIPLE BUS MASTERS WITH THE ACCELERATED GRAPHICS PROTOCOL (AGP) BUS

FIELD OF THE INVENTION

The invention relates generally to circuits that utilize an accelerated graphics protocol (AGP) bus, and more particularly to the method and apparatus for supporting multiple bus masters with the AGP bus.

BACKGROUND OF THE INVENTION

Computing systems are often constructed from a number of components produced by a number of different manufacturers. In order to aid in the design and production of various components that are capable of interoperating in computing systems, standards are established such that components designed by different manufacturers are capable of operating in a common system. One such example of a portion of the computing system that has been standardized is the accelerated graphics protocol (AGP) bus structure.

The AGP bus is an intercoupling bus that expands on the protocol of the peripheral component interconnect (PCI) bus standard. The AGP expansion of the PCI bus adds additional signals that can be used to allow for specific types of data transfers over the bus structure that may be more efficient than what was possible in the original PCI protocol. The PCI bus protocol is detailed in the PCI local bus specification, and the AGP enhancement of the PCI bus protocol is described in the AGP specification R2.0.

The AGP bus is typically used in video graphics circuits to allow a device such as a graphics processor to couple to a bus interface. The bus interface enables the graphics processor to communicate with other components of the computing system. The AGP bus consists of a number of signals that carry control and data information to and from the end components coupled to the AGP bus. In order to promote efficient data transmission using the AGP bus, one of the components coupled to the bus typically becomes a bus master, which allows for data to be transmitted in a manner which is more efficient than transfers that do not using bus mastering.

As graphics systems continue to evolve, the complexity of the graphics processing operation increases dramatically. As such, it may be desirable to include multiple graphics processors on a single graphics processing circuit, such as a graphics card that would be inserted into a personal computer. Such circuits typically are only provided with a single interface to a single AGP bus structure, and therefore the multiple graphics processors must share the capabilities of the AGP bus in their interaction with other computing system components.

Therefore, a need exists for a method and apparatus that allows multiple bus masters to be supported on a single AGP bus structure.

DETAILED DESCRIPTION

Generally, the present invention provides a method and apparatus for supporting multiple bus masters on an AGP bus. A first bus master is configured as an AGP bus master and utilizes the AGP request portion of the AGP bus structure to issue bus master requests. A second bus master is configured as a PCI bus master and utilizes the PCI bus master request portion of the AGP bus to assert bus master requests. When bus master grants are received via the AGP bus, status lines, such as those included in the AGP bus structure, are used to determine the character of the bus master grant. When the status lines indicate that the bus master grant is an AGP bus master grant, the AGP bus master performs AGP bus master operations. When the status lines indicate that the bus master grant is a PCI bus master grant, the PCI bus master is enabled and allowed to perform PCI bus mastering operations. By allowing both an AGP and a PCI bus master to coexist on a single AGP bus simultaneously, multiple bus masters can be supported in a system over a shared AGP bus. In graphics applications, this allows multiple graphics processors to coexist on a graphics card while enabling each of the graphics processors to have some form of bus mastering capabilities.

Figure 1:
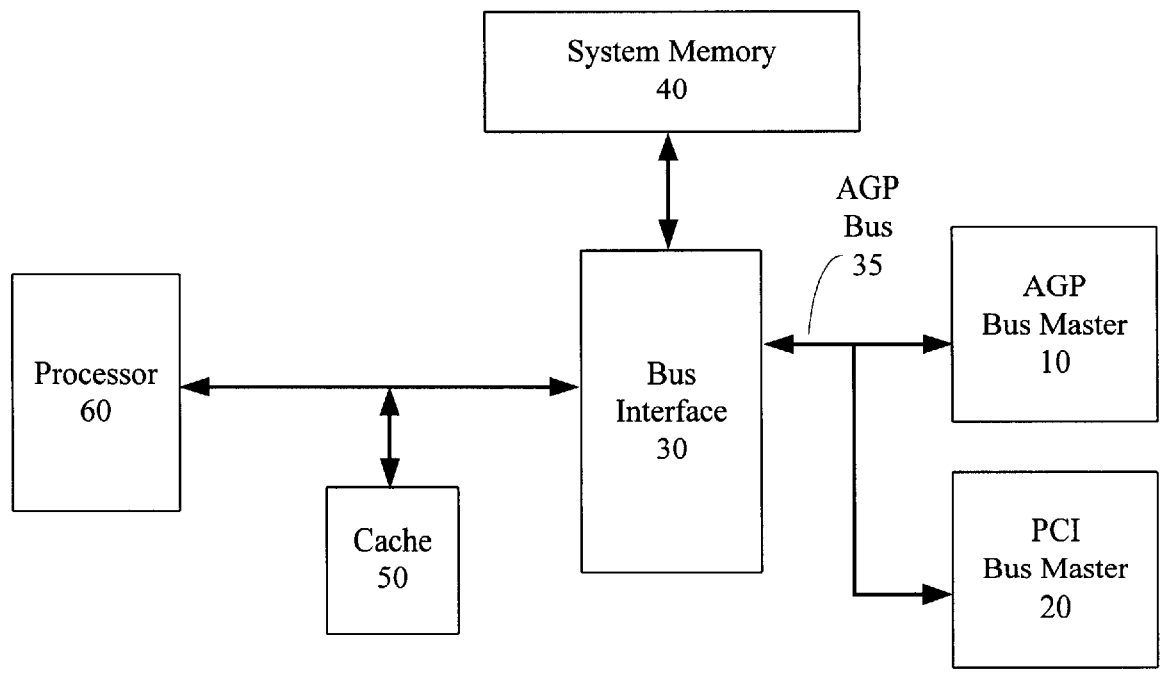
FIG. 1 illustrates a block diagram of a circuit in accordance with an embodiment of the present invention.
Figure 2:
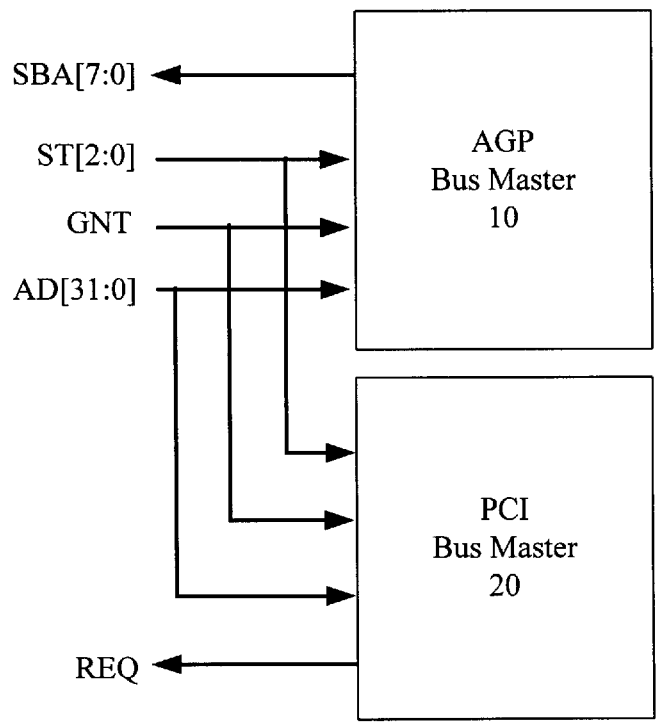
FIG. 2 illustrates a more detailed block diagram of multiple bus masters coupled to an AGP bus in accordance with an embodiment of the present invention.
Figure 3:
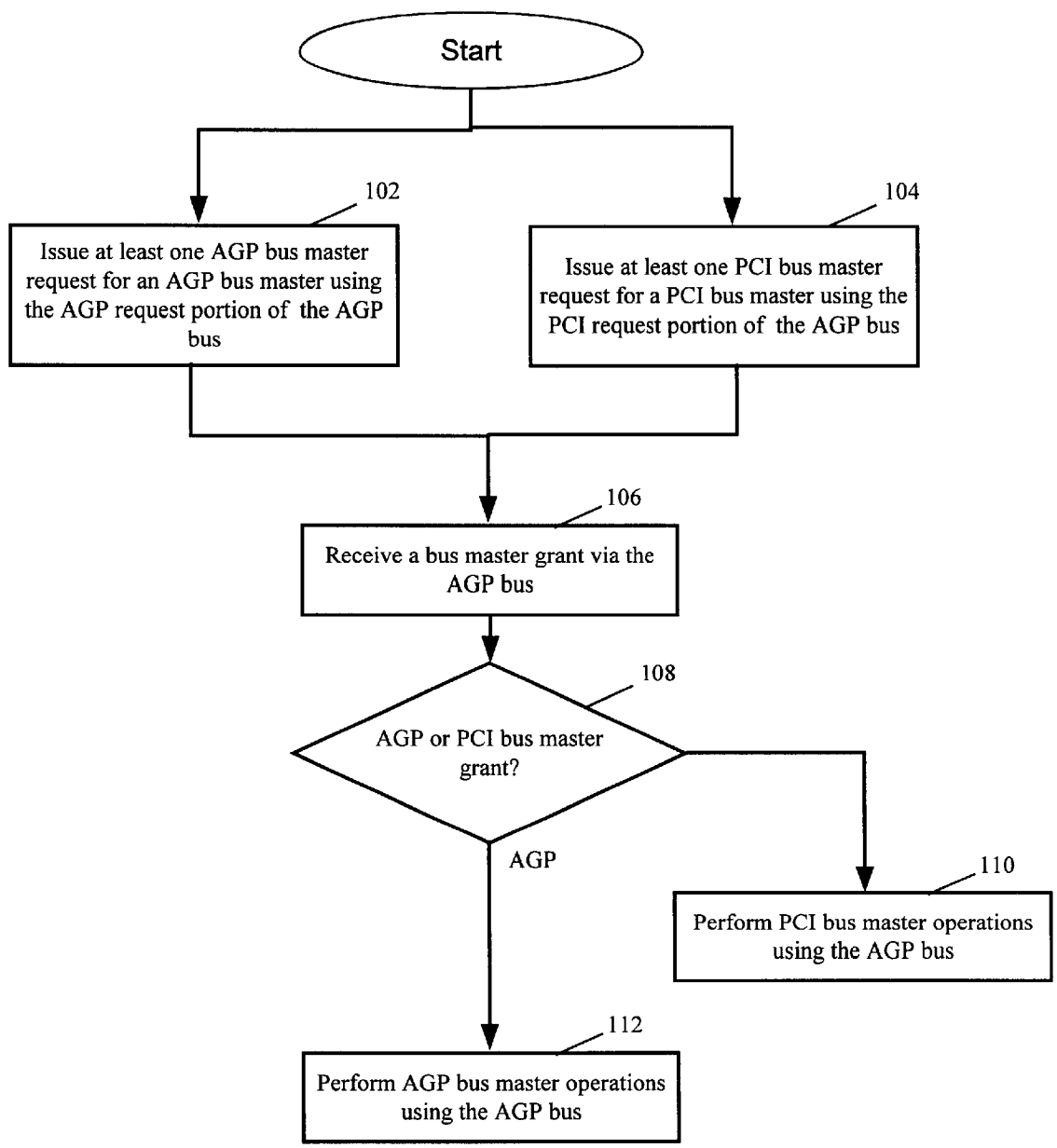
FIG. 3 illustrates a flow diagram of a method for supporting multiple bus masters on an AGP bus.

The invention can be better understood with referenced to FIGS. 1–3. FIG. 1 illustrates a block diagram of a circuit that includes an AGP bus master 10, a PCI bus master 20, and an AGP bus 35. The AGP and PCI bus masters may be included on a printed circuit board in the graphics circuit of FIG. 1, and in further integrated systems, the AGP and PCI bus masters may be included as separate processing entities on a single integrated circuit. As stated earlier, the AGP interface protocol includes additional control signals that are used in conjunction with the standard PCI protocol signal set. The AGP protocol is essentially piggy-backed onto the PCI bus protocol. As such, both AGP and PCI operations can be interleaved on the same physical connection. The AGP bus 35 is adapted to operably couple to the bus interface 30, which in turn is adapted to couple to system memory 40 and the processor 60. In order to promote more efficient access of memory by the processor 60, the cache 50 may be included in the graphics system. The use of a cache 50 in conjunction with the processor 60 is an interaction that well known in the art.

The bus interface 30 provides for bus format conversion and buffering capabilities. An example bus interfaces are the chip sets produced by the INTEL Corporation. The bus interface 30 allows for interaction between each of the components that is coupled to the bus interface 30. The AGP bus 35 is typically used to couple a graphics processor to the other components in the circuit illustrated in FIG. 1.

When a component coupled to the AGP bus desires to become a bus master such that efficient data exchange between that component and another system component can occur, a bus master request is issued by the component wishing to become bus master. An arbiter within the bus interface 30 determines when an appropriate time to allow the requesting entity to become bus master exists, and then asserts a grant signal that enables the requesting entity to become the bus master.

The AGP bus includes only one dedicated set of bus master requests and grant signals. These signals do not include any tag bits that could be used to identify different entities that are performing the requests for bus mastering capabilities. Nor are any dedicated tag bits included in the grant signal to indicate to which requesting entity a bus master grant is intended. As such, providing for bus mastering capabilities to multiple bus masters was not supported in prior art systems that utilize the AGP bus structure.

In order to enable multiple bus masters to exist on a single AGP bus 35, one bus master is defined as the AGP bus master 10, whereas the other bus master is defined as the PCI bus master 20. The AGP bus master 10 issues its bus master requests utilizing different request signals than that of the PCI bus master 20. The specific signals that may be used are illustrated in additional detail in FIG. 2.

FIG. 2 illustrates the AGP bus master 10 and the PCI bus master 20 as they may be coupled to a portion of the signals included in the AGP bus 35 of FIG. 1. The AGP bus master 10 may issue its bus master requests utilizing the side band address (SBA) signals included in the AGP bus. In another embodiment, the PIPE# request protocol that is available in the AGP protocol is used by the AGP bus master 10. The SBA and PIPE# portions of the AGP protocol may each be used as the AGP request portion of the AGP bus. In contrast, the PCI bus master 20 issues its bus master requests using the PCI bus master request (REQ) that is well understood in the PCI protocol. The bus interface 30 of FIG. 1 is able to distinguish between these two different types of requests, and when it performs its arbitration to determine when bus master grants are to be issued, it can include information that distinguishes between an AGP and a PCI bus master grant.

A bus master grant is typically indicated through assertion of the grant (GNT) signal. By utilizing the grant signal in conjunction with the status (ST) signals, the bus master grant being issued can be classified as either a PCI or AGP bus master grant. Note that other signals could be used to characterize the bus master grant, such as additional signals included to enhance the AGP bus structure in a particular system. In one example, the status lines, which may include three bits, indicate an AGP bus master grant by conveying a value between 0 and 6, inclusive, across the three status bits. In such an example, a value of 7 on the status lines would indicate that the bus master grant is a PCI bus master grant. As is apparent to one of ordinary skill in the art, the values communicated via the status lines for classification of the bus master grant could vary based on implementation.

When multiple bus masters are supported over an AGP bus in a video graphics card, or other video graphics circuit, one or more of the bus masters may be graphics processors. In other embodiments, AGP and PCI bus masters 10 and 20 could be other devices such as multimedia devices that perform video and/or audio capture, playback, and/or compression. Other high speed devices such as a network controller or storage controller could also included as the AGP and/or PCI bus master in a particular system. In one embodiment both of the AGP and PCI bus masters 10 and 20 are graphics processors. In such a system, both of the graphics processors may be the same graphics processor where neither is optimized for AGP or PCI bus master operations. In other embodiments, the graphics processor that is associated with becoming the AGP bus master may be optimized in terms of optimizing the operations in the graphics circuit that the AGP bus master performs to correspond to the additional capabilities provided in the AGP protocol. Similarly, the graphics processor associated with becoming the PCI bus master may be optimized such that its operations correspond to any unique aspects of its PCI bus mastering capabilities.

In another embodiment, the teachings provided herein may be used in conjunction with those in co-pending patent application entitled "Method and Apparatus for Configuring Multiple Devices in a Computer System" having Ser. No. 09/412,026 which was filed on the same date as the present application and is incorporated herein by reference. Combining the teachings of the two inventions provides the ability to include multiple devices on a shared bus structure where each of the devices has bus mastering capabilities and where uniform configuration of the devices is possible.

Each of the components coupled to the AGP bus 35 may also be able to serve as a slave in terms of enabling the bus interface 30 to operate as the bus master for transfer operations with respect to the slave. In order to facilitate multiple slaves on the AGP bus 35, each of the AGP bus master 10 and the PCI bus master 20 must recognize a unique identification select. The identification select is used in conjunction with addresses issued along the address and data (AD) lines included as a part of the AGP bus 35. The configuration of the address space on the AGP bus 35 is accomplished through the use of configuration cycles. These cycles assign the addresses associated with each of the components coupled to the AGP bus 35 such that when specific addresses are present in the AGP bus 35, the appropriate slave will recognize the address as applying to a transaction with which it is involved.

In prior art systems, the identification select (ID select) portion of each potential AGP slave was often hard-wired, or fixed in its configuration. As such, multiple instantiations of the same component could not reside on the AGP bus simultaneously, as each would map to the same portion of the address space when a configuration cycle was implemented. This limitation is overcome by enabling at least one of the AGP bus master 10 and the PCI bus master 20 to be capable of flexible ID select configuration. This allows for the AGP bus master 10 and the PCI bus master 20 to have different ID selects such that PCI slave configuration is able to assign the different addresses to each of the AGP and PCI bus masters 10 and 20 for operation as PCI slave devices.

FIG. 3 illustrates a flow diagram of a method for providing for more than one bus master on an AGP bus. The method begins at step 102 and/or step 104 where at least one AGP or PCI bus master request is issued. The AGP bus master requests are issued for an AGP bus master that is coupled to the AGP bus where the PCI bus master requests corresponds to a PCI bus master that is also coupled to the AGP bus. At step 102, when an AGP bus master request is issued, the AGP request portion (side band address port or PIPE#) portion of the AGP bus is employed to issue the bus master request. At step 104, when a PCI bus master request is issued, the PCI request portion of the APG bus is utilized.

At step 106, a bus master grant is received via the AGP bus. The grant is typically issued by an arbiter included in a bus interface circuit, such as that described with respect to FIG. 1 above. The arbiter receives the bus master requests from the AGP and PCI bus masters and is able to distinguish between the two types of requests. The grant generated in response is also generated such that there is differentiation between a bus master grant for the AGP bus master and a bus master grant for the PCI bus master.

At step 108, the character of the bus master grant is determined where the character indicates whether the bus master grant is an AGP bus master grant or a PCI bus master grant. Preferably, this determination is based on the status signals included in the AGP bus protocol as described earlier.

If it is determined at step 108 that the bus master grant corresponds to a PCI bus master grant, the method proceeds to step 110 Where PCI bus master operations are performed. These bus master operations are performed by the PCI bus master that issued the PCI bus master request to which a PCI bus master grant was received.

If it is determined at step 108 that the bus master grant received is an AGP bus master grant, the method proceeds to step 112. At step 112, AGP bus mastering operations are performed by the AGP bus master that triggered the issuance of the AGP bus master request to which the bus master grant corresponds.

As was the case with the system described in FIG. 1, the bus master entities in the method of FIG. 3 may be graphics controllers included on a single printed circuit board or a single integrated circuit. The printed circuit board could be an add-on or expansion card for use in a personal computer or could be a portion of a computer system motherboard. In order to allow these bus masters to operate as PCI slaves in terms of the PCI protocol, the identification select corresponding to at least one of the bus masters is configurable such that the identification select of the AGP bus master (AGP ID select) is different than the identification select corresponding to the PCI bus master (PCI ID select).

Allowing both a PCI and an AGP bus master to coexist on an AGP bus enables multiple graphics controllers to be included in a portion of a system that has a single AGP bus interface to the other portions of the system. Both the PCI and AGP bus masters can perform their bus mastering functions constrained only by any limitations corresponding to those defined by the PCI and AGP protocols. Having multiple graphics controllers on a single graphics card with an AGP bus connection provides the capability for more complex graphics processing that is desirable in computing systems.

It should be understood that the implementation of other variations and modifications of the invention and its various aspects will be apparent to those of ordinary skill in the art, and that the invention is not limited to the specific embodiments described. It is therefore contemplated to cover by the present invention any and all modifications, variations, or equivalents that fall within the spirit and scope of the basic underlying principles disclosed and claimed herein.

What is claimed is:

1. A circuit, comprising:
    an AGP bus, wherein the AGP bus is adapted to couple to an AGP port of a bus interface circuit, wherein the AGP bus supports AGP and PCI protocols;
    an AGP bus master operably coupled to the AGP bus, wherein the AGP bus master utilizes an AGP request portion of the AGP bus to issue AGP bus master requests; and
    a PCI bus master operably coupled to the AGP bus, wherein the PCI bus master utilizes a PCI request portion of the AGP bus to issue PCI bus master requests wherein the bus interface circuit receives the AGP and PCI bus master requests from the AGP and PCI bus masters, respectively, and issues bus master grants in response, wherein each of the bus master grants is classified as one of an AGP grant and a PCI grant based on status signals included in the AGP bus and the AGP bus master is configured to have an AGP identification select that differs from a PCI identification select of the PCI bus master.

2. The circuit of claim 1, wherein the AGP request portion of the AGP bus includes the side band address port portion of the AGP bus.

3. The circuit of claim 1, wherein the AGP request portion of the AGP bus includes the PIPE# portion of the AGP bus.

4. The circuit of claim 1, wherein the AGP and PCI identification selects are utilized for PCI slave configuration within the graphics circuit.

5. The circuit of claim 4, wherein at least one of the AGP and PCI bus masters is a graphics controller.

6. The circuit of claim 5, wherein the AGP and PCI bus masters are included on a printed circuit board.

7. The circuit of claim 5, wherein the AGP and PCI bus masters are separate processors included in an integrated circuit.

8. The graphics circuit of claim 1 further comprises system memory operably coupled to the bus interface circuit.

9. The graphics circuit of claim 8 further comprises a processor operably coupled to the bus interface circuit.

10. The graphics circuit of claim 9, wherein the processor is operably coupled to the bus interface circuit via a processor bus, and wherein the graphics circuit further comprises cache memory operably coupled to the processor bus.

11. A method for providing for more than one bus master on an AGP bus, comprising:
    issuing at least one AGP bus master request for an AGP bus master coupled to an AGP bus, wherein the AGP bus master request is issued utilizing an AGP request portion of the AGP bus;
    issuing at least one PCI bus master request for a PCI bus master coupled to the AGP bus, wherein the PCI bus master request is issued utilizing a PCI request portion of the AGP bus; and
    receiving at least one bus master grant via the AGP bus;
    for each bus master grant received:
        determining character of the bus master grant, wherein the character of the bus master grant indicates that the bus master grant is one of an AGP bus master grant and a PCI bus m aster grant;
        determining character of the bus master grant further comprises determining the character of the bus master grant based on status signals included in the AGP bus;
        when the character of the bus master grant indicates that the bus master grant is an AGP bus master grant, performing AGP bus master operations; and
        when the character of the bus master grant indicates that the bus master grant is a PCI bus master grant, performing PCI bus master operations; and
        configuring the AGP bus master and the PCI bus master such that an AGP identification select corresponding to the AGP bus master is different than a PCI identification select corresponding to the PCI bus master.

12. The method of claim 11, wherein the AGP request portion of the AGP bus includes at least one of a side band address port portion of the AGP bus and a PIPE# portion of the AGP bus.

13. The method of claim 11, wherein at least one of the AGP bus master and the PCI bus master is a graphics controller.

14. The method of claim 13 wherein the AGP bus master and the PCI bus master are included on a printed circuit board.

15. The method of claim 13 wherein the AGP bus master and the PCI bus master are included on an integrated circuit.

16. An expansion card, comprising:
    an AGP bus interface adapted to couple to an AGP port of a bus interface circuit;
    an AGP bus operably coupled to the AGP bus interface, wherein the AGP bus includes status signals, a PCI request portion, and an AGP request portion;
    an AGP bus master operably coupled to the AGP bus, wherein the AGP bus master issues AGP bus master requests using the AGP request portion of the AGP bus, wherein the AGP bus master determines that bus master grants received correspond to the AGP bus master requests based on at least a first portion of the status signals; and a PCI bus master operably coupled to the AGP bus, wherein the PCI bus master issues PCI bus master requests using the PCI request portion of the AGP bus, wherein the PCI bus master determines that bus master grants received correspond to the PCI bus master requests based on at least a second portion of the status signals and an identification select corresponding to the AGP bus master is configured to a first value and an identification select corresponding to the PCI bus master is configured to a second value.

17. The graphics card of claim 16, wherein at least one of the AGP and PCI bus masters is a graphics controller.

18. The graphics card of claim 17, wherein the AGP and PCI bus masters are both graphics controllers.

* * * * *